United States Patent [19]

Suketomo et al.

[11] Patent Number: 4,972,915
[45] Date of Patent: Nov. 27, 1990

[54] HYDRAULIC STEERING APPARATUS

[75] Inventors: Toshitaka Suketomo, Kawasaki; Masanori Ikari, Sayama, both of Japan

[73] Assignee: Kabushiki Kaisha Komatsu Seisakusho, Tokyo, Japan

[21] Appl. No.: 397,463

[22] PCT Filed: May 26, 1988

[86] PCT No.: PCT/JP88/00509

§ 371 Date: Aug. 21, 1989

§ 102(e) Date: Aug. 21, 1989

[87] PCT Pub. No.: WO88/09280

PCT Pub. Date: Dec. 1, 1988

[30] Foreign Application Priority Data

May 26, 1987 [JP] Japan .................. 62-126883

[51] Int. Cl.$^5$ .................. B62D 5/06; B62D 5/18
[52] U.S. Cl. .................. 180/132; 91/358 R
[58] Field of Search .................. 180/132, 141, 79; 91/358 R, 359

[56] References Cited

FOREIGN PATENT DOCUMENTS

| 60-80973 | 5/1985 | Japan . |
| 60-106876 | 7/1985 | Japan . |
| 60-132978 | 9/1985 | Japan . |
| 265768 | 11/1988 | Japan .................. 180/132 |
| 291772 | 11/1988 | Japan .................. 180/132 |
| 8809280 | 12/1988 | World Int. Prop. O. .......... 180/132 |

*Primary Examiner*—Mitchell J. Hill
*Attorney, Agent, or Firm*—Ronald P. Kananen

[57] ABSTRACT

A hydraulic steering apparatus for a construction vehicle, which has been developed for the purpose of improving the steering control performance of an apparatus of this kind by preventing the occurrence of nonsynchronousness between a steering wheel and a knuckle arm or some other pivotable member, and eliminating a dead zone ascribed to an operation of a link mechanism. This steering apparatus has a pilot valve (2) connected directly to a steering wheel, a main control valve (7) provided separately from the pilot valve and adapted to be operated by a pressure oil sent from a pilot pump (9) which is controlled by the pilot valve, a steering cylinder (6) to which a pressure oil is supplied from a main pump (8) via the main control valve, and a feedback line (4) connected between a pivotable member (5), such as a knuckle arm connected pivotably to a piston rod in the steering cylinder and a spool in the pilot valve.

2 Claims, 1 Drawing Sheet

HYDRAULIC STEERING APPARATUS

TECHNICAL FIELD OF THE INVENTION

This invention relates to a hydraulic steering apparatus for construction vehicles, and more particularly to a hydraulic steering apparatus suitable for use in effecting hydraulic steering of vehicles which use fluid pressure as a power for steering, and steering control of which is difficult because of high flow rate of hydraulic fluid and heavy weight of the vehicle.

BACKGROUND ART OF THE INVENTION

In a hydraulic steering apparatus for construction vehicles which require extremely high power and flow rates of hydraulic fluid for steering purposes, linkage type and fully hydraulically operating type steering apparatuses comprising fully hydraulically actuated steering values have generally been used.

In a linkage type steering apparatus shown in FIG. 1, reference character "a" denotes a steering wheel, "b" a control valve, "c" a gear box, "d" a steering cylinder, "e" an arm, and "f" a pump. When the steering wheel "a" is turned by manipulation of the driver, the plunger in the control valve "b" is actuated through the linkage mechanism to allow fluid under pressure to flow into the steering cylinder "d" thereby actuating the piston in the steering cylinder "d" to turn the air "e". When the arm "e" is turned, a feed-back force is applied to the control valve "b" so that fluid under pressure is supplied through the control valve "b" into the steering cylinder "d" at a flow rate which corresponds with the turning speed of the steering wheel "a".

Whilst, the fully hydraulically operating type steering apparatus comprises a fully hydraulically actuated steering valve and a rotor. In this system, a control valve in the above-mentioned steering valve is actuated by the input from the steering wheel given by the manipulation thereof by the driven. As a result, the fluid under pressure delivered by the hydraulic pump is allowed to flow into the steering cylinder circuit to actuate the steering cylinder thereby turning the arm connected to the piston rod in the steering cylinder. At that time, the control valve receives a feed-back force which corresponds with the amount of turning of the rotor so that the fluid under pressure can be supplied into the steering cylinder at a flow rate corresponding with the turning speed of the steering wheel.

In the above-mentioned linkage type steering apparatus shown in FIG. 1, the displacement of the steering cylinder and subsequent component parts is fed back, and therefore a smooth operational feeling is obtained by the driver. However, since there are insensitive or dead zones such as backlash, etc. in the links and gears in the component parts up to the control valve "b", the play in the steering wheel "a" is considerably big, and there has been a problem relevant to steering controls, particularly when the vehicle is running at high speeds.

Whilst, the fully hydraulically operating type steering apparatus has characteristic features that since there is no linkage mechanism in the component parts up to the control valve the play of the steering wheel is small, and since the feed-back operation is made by the rotor the response of the hydraulic system is more excellent than that of the linkage type steering apparatus, and further because it is connected with the steering cylinder with hydraulic fluid pipings a large degree of freedom from the viewpoint of the layout is obtained, and therefore of late, steering apparatuses of fully hydraulically operating system have mostly been used instead of the linkage type ones.

However, in the fully hydraulically operating system, since the feed-back operation is made within the hydraulic system, and the entire systems in the hydraulic steering apparatus do not form a closed loop, there occurs non-synchronousness between the angle of turning of the steering wheel and the displacement of the piston in the cylinder. Stating in brief, the fully hydraulically operating system is disadvantageous in that, since it has no mechanical feed-back mechanism, leakage of fluid under pressure tends to cause non-synchronousness between the angle of turning of the steering wheel and the displacement of the piston in the cylinder.

In particular, in cases of vehicles such as fork lifts and shovel loaders wherein the steering wheel is provided with a knob, there has been a problem in that the position of the knob relative to the direction of advancement of the vehicle undergoes a divergence thus impairing the steerage thereof.

SUMMARY OF THE INVENTION

The present invention has been made in view of the above-mentioned circumstances, and has for its object to provide a hydraulic steering apparatus for construction vehicles which is capable of exhibiting an improved steering performance by preventing the occurrence of nonsynchronousness between a steering wheel and a knuckle arm or other pivotable member and also eliminating a dead zone due to the operation of a linkage mechanism.

To achieve the above-mentioned object, according to the present invention, there is provided a hydraulic steering apparatus for construction vehicles, characterized in that it comprises a pilot valve connected directly to a steering wheel so that it may be operated directly by the steering wheel; a main control valve adapted to be actuated by the fluid under pressure delivered by a pilot pump controlled by the pilot valve and serving to control the supply of the fluid under pressure delivered by a main pump; a steering cylinder to which the fluid under pressure delivered by the main pump is supplied by the operation of the main control valve; a pivotable member such as a knuckle arm, etc. which is pivotally connected to a piston rod of a piston slidably mounted in the steering cylinder and adapted to be turned in response to the operation of the steering cylinder; and a feed-back link connected between the pivotable member and a spool in the pilot valve so as to push or urge the pilot valve spool in proportion to the angle of rotation of the pivotable member.

The above-mentioned and other advantages, aspects and objects of the present invention will become apparent to those skilled in the art by referring to the following description and the accompanying drawings in which a preferred embodiment in compliance with the principles of the present invention is shown.

DETAILED DESCRIPTION OF PREFERRED EMBODIMENT

The present invention will now be described by way of example only with reference to FIG. 2 of the accompanying drawings.

Figure 1:
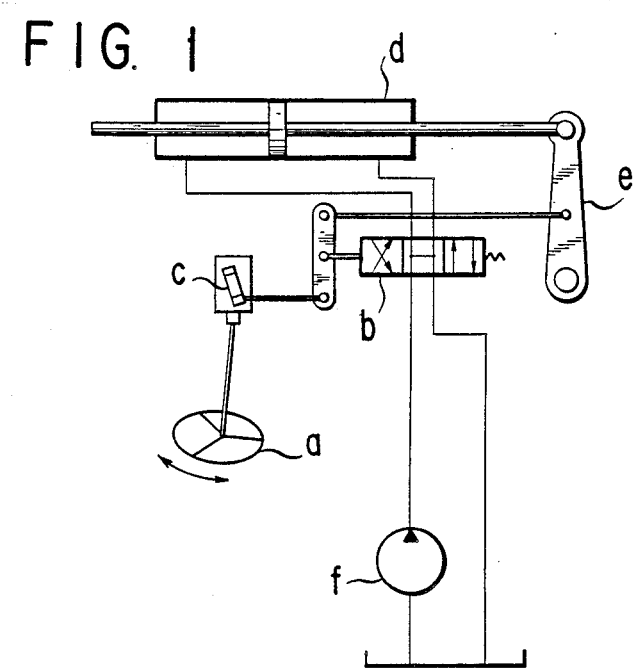
FIG. 1 is a schematic, configurational explanatory view showing an example of a conventional linkage type hydraulic steering apparatus.
Figure 2:
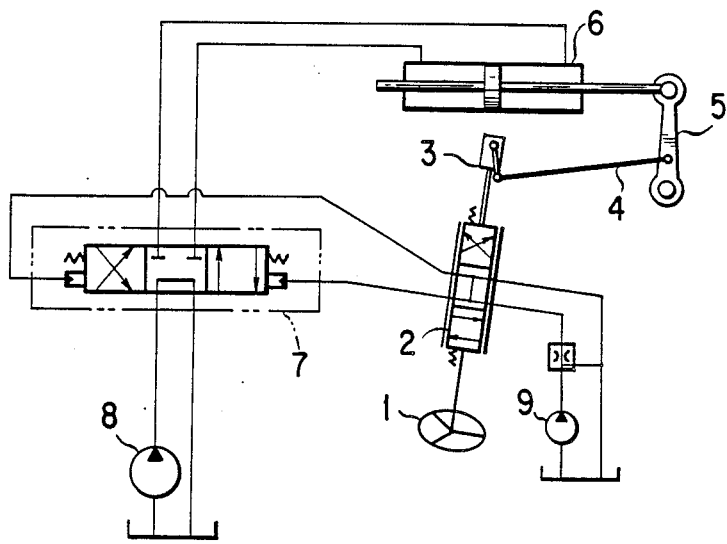
FIG. 2 is a schematic, configurational explanatory view showing one embodiment of improved hydraulic steering apparatus according to the present invention.

In FIG. 2, reference numeral 1 denotes a steering wheel, and 2 a pilot valve adapted to be displaced by the rotation of the steering wheel 1. Reference numeral 3 denotes a gear mechanism adapted to reduce the rotational speed of the steering wheel 1, and which is connected to a knuckle arm or another pivotable member 5 by means of a feed-back link 4. Reference numeral 7 indicates a main control valve adapted to be actuated by the fluid under pressure delivered by a pilot pump 9 when the pilot valve 2 is rendered operative.

When the main control valve 7 is actuated, the fluid under pressure delivered by a main pump 8 is supplied into a steering cylinder 6 so as to turn the above-mentioned knuckle or another pivotable member 5.

Accordingly, there is no linkage mechanism interposed between the pilot valve 2 and the steering wheel 2, and therefore the number of insensitive or dead zones can be reduced. Further, since the pilot valve 2 is connected mechanically to the knuckle arm or another member 5 by means of the feed-back link 4, there is no possibility of non-synchronousness occurring between the steering wheel 1 and the steering cylinder 6. Further, because of separate or independent provision of the pilot valve 2 and the main control valve 7, a small sized and low pressure actuated valve can be used as the pilot valve 2.

Since the present invention is constructed as mentioned hereinabove, the occurrence of non-synchronousness between the steering wheel and the knuckle arm or another pivotable member can be prevented and the number of dead or insensitive zones in the pilot valve can be eliminated thereby providing an enhanced steering control performance.

Further, because of separate provision of the pilot valve and the main control valve, a small-sized and low pressure actuated valve can be used as the control valve, and also by varying the size of the main control valve the same pilot valve can be used for a multiplicity of kinds of machines thereby achieving a marked cost reduction.

We claim:

1. A hydraulic steering apparatus characterized in that it comprises a pilot valve connected directly to a steering wheel so that it may be operated directly by the steering wheel; a main control valve adapted to be actuated by the fluid under pressure delivered by a pilot pump controlled by the pilot valve and serving to control the supply of the fluid under pressure delivered by a main pump; a steering cylinder to which the fluid under pressure delivered by said main pump is supplied by the operation of the main control valve; a pivotable member pivotally connected to a piston rod of a piston slidably mounted in the steering cylinder and adapted to be turned in response to the operation of the steering cylinder; and a feed-back link connected between the pivotable member and a spool in the pilot valve so as to push or urge said pilot valve spool in proportion to the angle of rotation of the pivotable member.

2. The steering apparatus of claim 1, wherein said pivotal member is a knuckle arm.

* * * * *